United States Patent [19]

McDonald et al.

[11] Patent Number: 5,593,267

[45] Date of Patent: Jan. 14, 1997

[54] AUTOMATED SYSTEM FOR SELECTING AND DELIVERING PACKAGES FROM A STORAGE AREA

[75] Inventors: Sean C. McDonald, Pittsburgh, Pa.;
Ellen J. Hertz, Clemmons, N.C.;
James A. Smith, Allison Park, Pa.;
Gregory Toto, Santa Cruz, Calif.

[73] Assignee: Automated Healthcare, Inc., Pittsburgh, Pa.

[21] Appl. No.: 452,646

[22] Filed: May 25, 1995

Related U.S. Application Data

[62] Division of Ser. No. 295,495, Aug. 25, 1994, Pat. No. 5,468,110, which is a continuation of Ser. No. 871,832, Apr. 21, 1992, abandoned, which is a continuation-in-part of Ser. No. 469,217, Jan. 24, 1990, abandoned.

[51] Int. Cl.⁶ ..................................................... B65G 1/04
[52] U.S. Cl. .......................................... 414/273; 414/280
[58] Field of Search ..................................... 235/385, 351; 414/266, 267, 268, 269, 270, 273, 274, 276, 277, 280, 281, 282, 285, 331; 221/3, 5, 9, 15; 364/478, 413.02, 479

[56] References Cited

U.S. PATENT DOCUMENTS

| | | | |
|---|---|---|---|
| 3,802,580 | 4/1974 | Castaldi | 414/280 |
| 3,986,612 | 10/1976 | Kamm et al. | 209/111.7 |
| 4,546,901 | 10/1985 | Butarazzi | 414/280 |
| 4,651,863 | 3/1987 | Reuter et al. | 414/280 |
| 4,669,047 | 5/1987 | Chucta | 414/331 |
| 4,678,390 | 7/1987 | Bonneton et al. | 414/282 |
| 4,786,229 | 11/1988 | Henderson | 414/273 |
| 4,789,295 | 12/1988 | Boucher, Jr. et al. | 414/280 |
| 4,792,270 | 12/1988 | Yoshida | 414/273 |
| 4,812,629 | 3/1989 | O'Neil et al. | 414/274 |
| 4,820,109 | 4/1989 | Witt | 414/282 |
| 4,896,024 | 1/1990 | Morello et al. | 414/274 |
| 5,129,777 | 7/1992 | Pohjonen et al. | 414/280 |

FOREIGN PATENT DOCUMENTS

| | | | |
|---|---|---|---|
| 304 | 1/1979 | European Pat. Off. | 414/273 |
| 2596299 | 10/1987 | France . | |
| 85/00232 | 8/1984 | WIPO . | |

Primary Examiner—Frank E. Werner
Attorney, Agent, or Firm—Buchanan Ingersoll, P.C.; Lynn J. Alstadt

[57] ABSTRACT

A system for filling orders, such as prescriptions for patients, comprising a device for holding packages. Each package has the same type of contents being held in a predetermined location by the holding device. Each package has an identity which defines the contents therein. The holding device has a plurality of predetermined locations corresponding to a plurality of different types of contents. Additionally, the system is comprised of a device for supplying packages to the holding device. Also, there is a device for picking a package from the holding device that is identified in the order for the purpose of restocking the holding device. The picking device is in communication with the holding device and supplying device. In a preferred embodiment, the contents of each package is a single dosage of medicine.

11 Claims, 19 Drawing Sheets

5,593,267

AUTOMATED SYSTEM FOR SELECTING AND DELIVERING PACKAGES FROM A STORAGE AREA

Related Application

This application is a division of Ser. No. 08/295,495 filed Aug. 25, 1994, now U.S. Pat. No. 5,468,110 which is a continuation of Ser. No. 07/871,832, filed Apr. 21, 1992, now abandoned which is a continuation-in-part of our U.S. patent application Ser. No. 07/469,217 filed Jan. 24, 1990, now abandoned.

FIELD OF THE INVENTION

The present invention relates to an automated system for selecting stored articles. More specifically, the present invention relates to an automated system for filling prescriptions and restocking medicines in a pharmacy.

BACKGROUND OF THE INVENTION

Many industries store products or parts in a storeroom or storage area and repeatedly select some of the stored items to fill orders or for other uses. Such items may range from small electronic components used by a manufacturer of electronic devices to automotive parts, which vary in size, used by service departments of automobile dealerships. Usually one or more people are employed to retrieve the requested items and to restock new and returned items. These individuals may also be required to confirm that the requested items are compatible with one another and with previously supplied items. If the supplied items are to be billed to a customer or charged to particular internal accounts, the list of items is first written by the requester, and rewritten or entered into a computer database by the storeroom attendant to create an invoice, supply list or other document. In some instances, further generations of the list are made by installers, users or billing clerks. Such methods have built-in opportunities for mistakes every time a list is rewritten and are less efficient than automated systems. Moreover, as labor costs rise and the size of inventory needed to be stored expands, the conventional storeroom and parts department become more and more expensive.

Some businesses have attempted to control costs by limiting inventory through standardization of parts. But such limits are not possible or desirable in some industries, particularly in a hospital pharmacy.

currently, in large hospital environments, doctors visit patients in nursing units and write out medication orders for each patient. A patient is typically placed on a certain medication which may require multiple doses of medication be administered over a period of a day. Some medications are administered at certain times of the day and possibly at intervals of several hours. Patients may also request certain medications on an elective basis for disorders such as headaches. These requests are included in the doctor's order that is sent from the nursing unit to the central pharmacy of the hospital.

Once an order is received by the pharmacy, it is checked by registered pharmacists and input into the pharmacy information system. These orders reflect not only orders that are added to a particular patient's treatment, but changes in the medication treatment. The pharmacy information system combines this information with the patient's existing medication schedule and develops a patient medication profile. A fill list is generated from that profile. The fill list is a list of all the medications that must be distributed to all patients for the day. This information is sent to the pharmacy printer where a hard copy is generated. Frequently, that hard copy or a copy thereof is sent to the billing department so that the medication can be charged to the patient or his insurer.

At this point, the drugs for a particular patient are handpicked by either a pharmacist or a pharmacy technician and placed in the particular patient's designated box. A registered pharmacist must then check the accuracy of the patient order before it leaves the pharmacy. Individual patient boxes are then loaded into a large cassette and delivered to the nursing unit.

Approximately 30% of the drugs dispensed each day are returned to the pharmacy unused. Since each drug is individually packaged, the drugs must be returned to the pharmacy stock. Patients are then credited for unused medication. This return and crediting process is a very time-consuming task and requires significant amount of pharmacy manpower.

In a typical large pharmacy, up to 35 pharmacists and pharmacy technicians are responsible for all aspects of the unit dose dispensing task. Because this process is done manually, a certain amount of error occurs. Studies have estimated that a half-percent error rate is typical in a large hospital. Since a hospital may dispense over 6,000 doses each day, this error rate leads to a significant number of missed or incorrect doses.

Several companies have tried to automate this process through various approaches to the problem. Meditrol utilizes a vending machine approach to dispense the unit dose medications. Each nursing unit must have its own stock of prescription drugs. Nurses key in a patient ID and the drugs for that patient are then dispensed from the vending machine. This system is very expensive because of the necessity of purchasing a machine for each nursing unit. Also, restocking each machine is a very time-consuming task. Implementation of this system requires a complete modification of the current drug dispensing process which many hospitals are reticent to undertake. The system claims no labor-saving advantages from its implementation. This system is covered under U.S. Pat. No. 3,917,045 titled "Drug Dispensing Apparatus" and dated Nov. 11, 1975.

Baxter Travenol offers a dispensing system from Samsung, a Korean company, which dispenses bulk solids into a package which is dispensed to the pharmacist. This system only dispenses the 200 most frequently used solids. A typical hospital pharmacy can contain over 1,500 different medications, many in liquid, syringe or bottle form. These medications cannot be automatically dispensed by this system, but must be manually selected by the pharmacist.

Neither system allows the dispensed medications to be automatically returned to the storage area.

There is a need for an automated system which is able to dispense all dosage forms currently contained in a hospital pharmacy. Medicines should be automatically dispensed by the system per a patient order and placed in individual patient medication boxes for a pharmacist to check. Each drug and each patient box should be individually bar coded so that the accuracy of the dispensing process can be automatically checked by the system. Once drugs are returned to the pharmacy, the system should automatically return each drug to its proper location in inventory and credit the patient's account for the return. One system should also keep a running inventory and notify the user whenever inventory of a particular item drops below a preset level and whether the shelf life of an item has passed. With such a system, a hospital can recognize significant labor savings, as well as savings based on improved accuracy in the dispensing function and better tracking of inventory and expired medications.

SUMMARY OF THE INVENTION

We provide an automated method and apparatus for selecting and restocking stored items, which is particularly useful for filling patient medication orders in a hospital pharmacy. The stored items must be packaged to be held in a storage rack. Preferably, each package contains a bar code corresponding to the package contents. The items are arranged in a main storage rack so that like items are in the same location and a predetermined location is provided for every item.

We prefer to provide a second rack or a designated portion of the main storage rack for receipt of new or returned items to be restocked. Such items can be randomly placed on this supply station for transmittal to their respective predetermined locations on the storage rack.

We also provide a means for picking items from and placing items in the storage rack and the supply station. The picking means preferably is comprised of a gripper assembly mounted on a transport vehicle which moves along a track or other controlled route. The gripper assembly preferably has a movable rod or other carrier for holding selected items, at least one vacuum head and associated controls for gripping and moving selected items. We prefer to provide a bar code reader for reading item packages.

We also prefer to provide a conveyor on which boxes, patient medication trays or drawers can be placed. The conveyor is positioned so that the picking means can place selected items into appropriate containers on the conveyor.

We provide a processing unit with associated memory and data entry peripherals. This computer system receives the list of requested items, directs the picking means, checks the items selected and prepares reports. Data can be entered manually through a keyboard or bar code reader or electronically through an RS 232 port. Reports may be printed, displayed on a console or transmitted to a memory or another computer for later use.

Other details and advantages of our method and apparatus will become apparent from the description of the preferred embodiments shown in the drawings.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
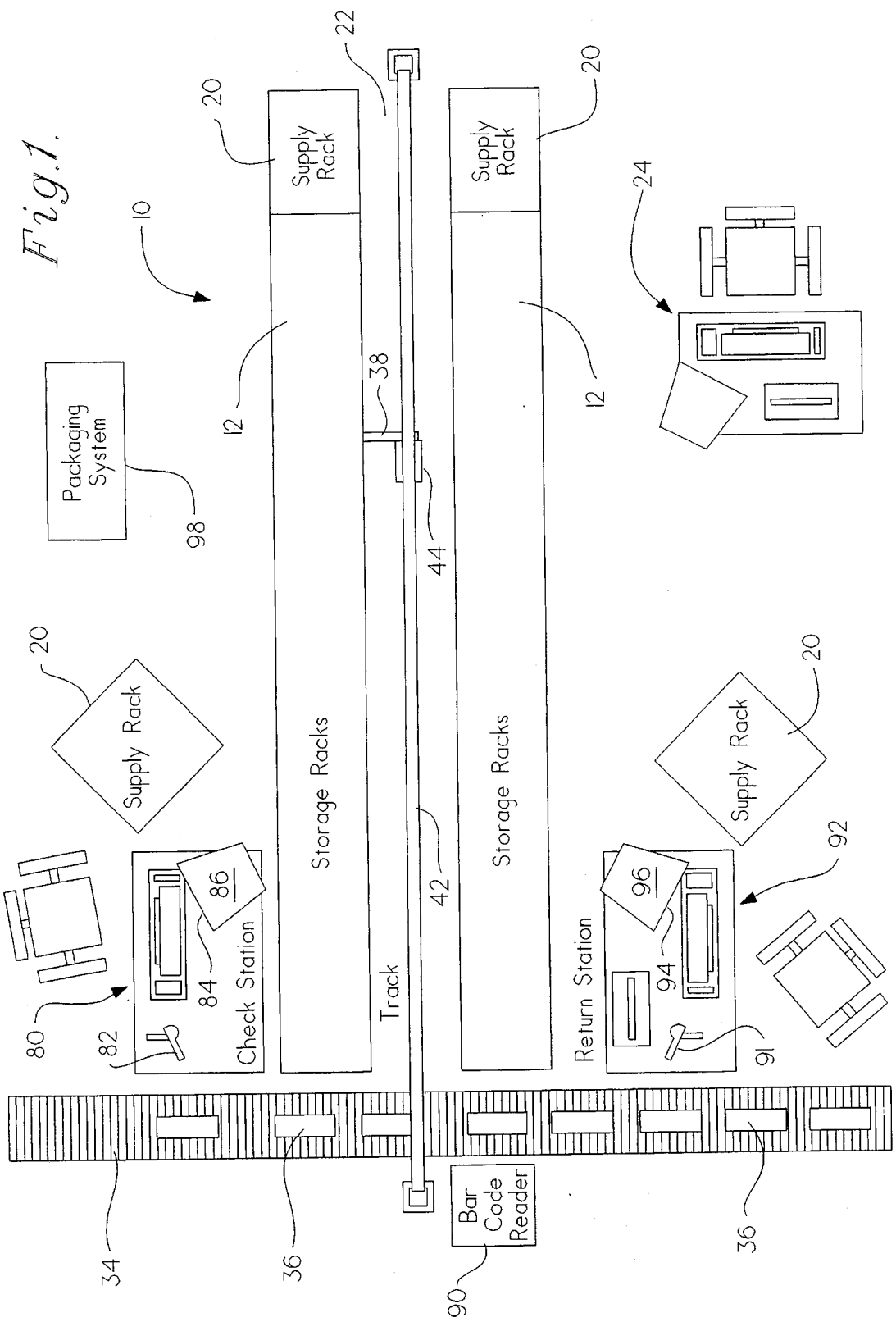
FIG. 1 is a schematic representation of our present preferred system.
Figure 3:
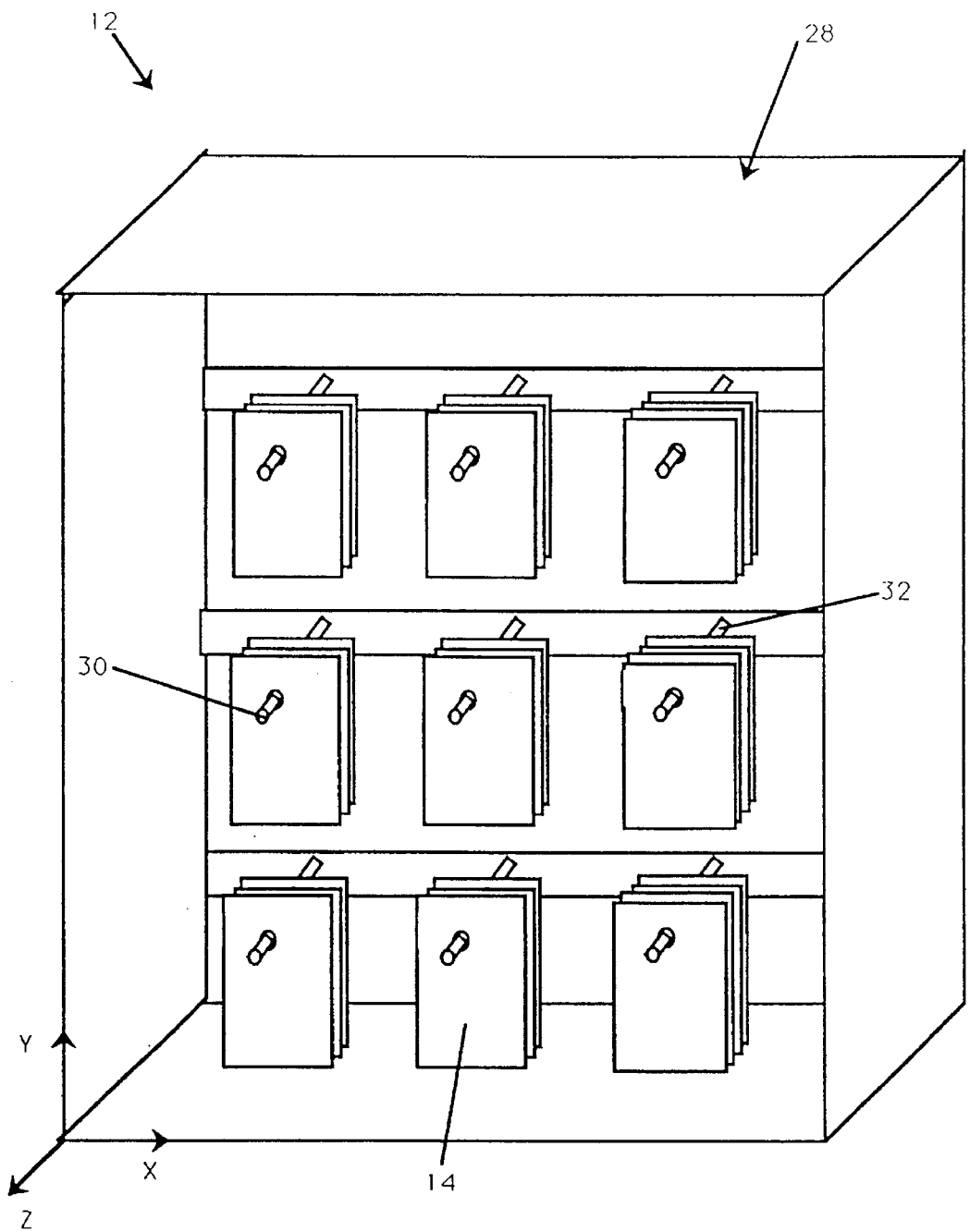
FIG. 3 is a perspective view of one present preferred storage rack.
Figure 4:
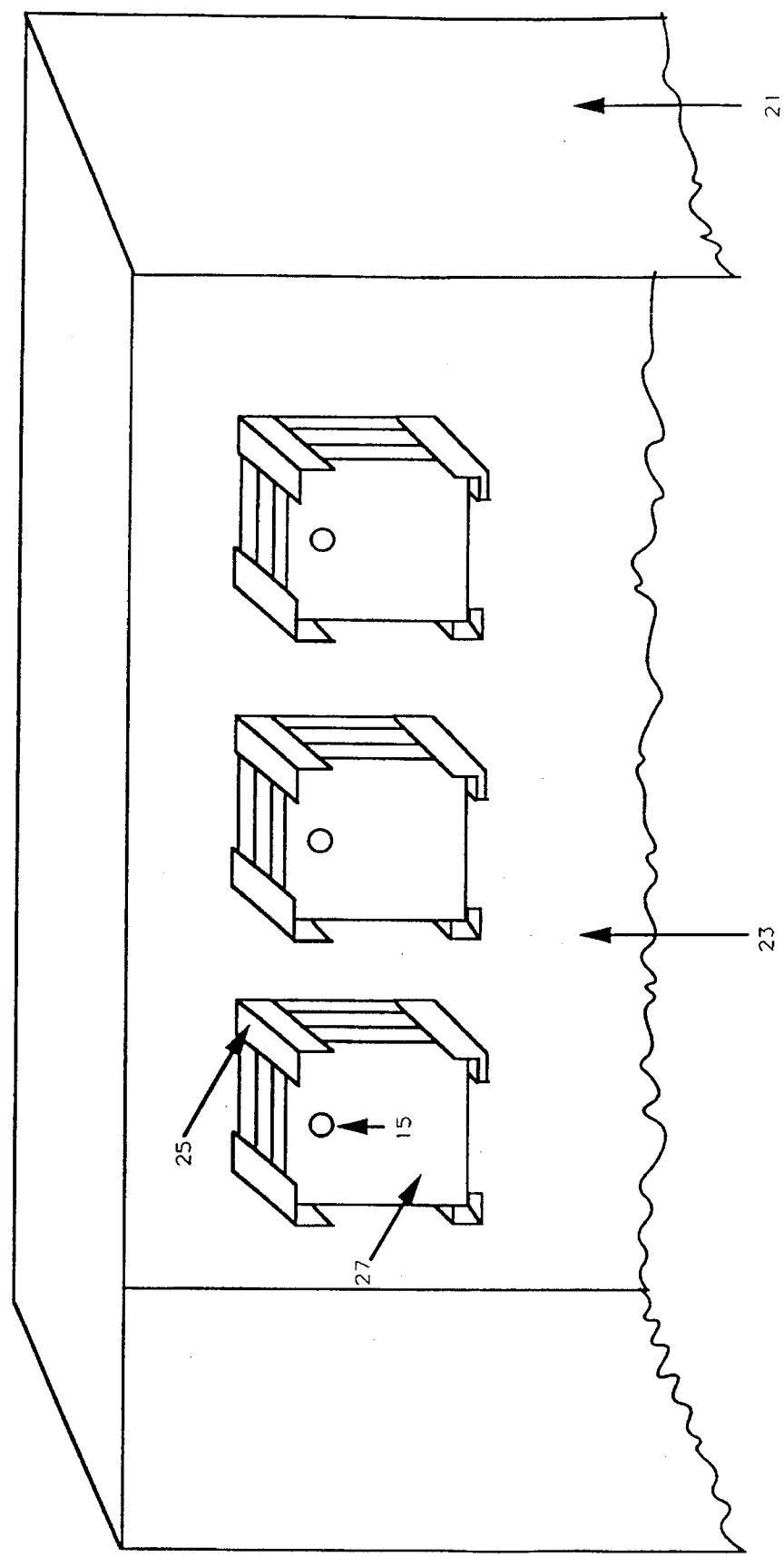
FIG. 4 is a perspective view of a portion of a second preferred storage rack.
Figure 5:
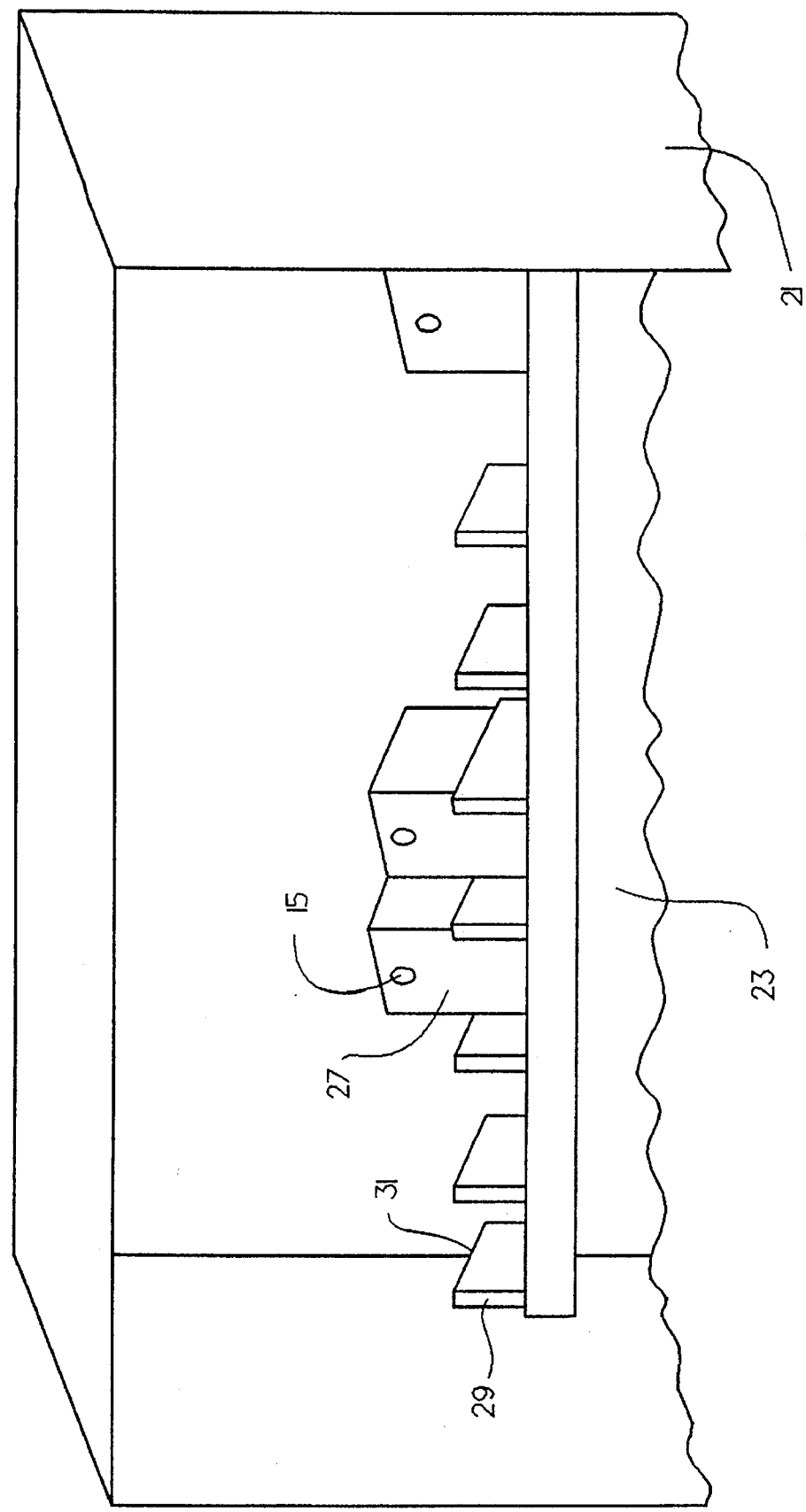
FIG. 5 is a perspective view of a portion of a third preferred storage rack.

Referring now to the drawings wherein like reference numerals refer to similar or identical parts throughout the several views, and more specifically to FIG. 1 thereof, there is shown a schematic representation of a present preferred system 10 for filling orders, such as prescriptions for patients. The system 10 contains storage racks 12 for handling packages. We prefer to provide at least two storage racks 12 and arrange them parallel to one another. Various storage rack designs can be used and certain present preferred storage racks are shown in FIGS. 3, 4 and 5. In our system, each package preferably contains only one product, although the product may consist of two or more related items, such as nut and bolt. When our system is installed in a hospital pharmacy, each package preferably contains a single dose of medicine.

Figure 2:
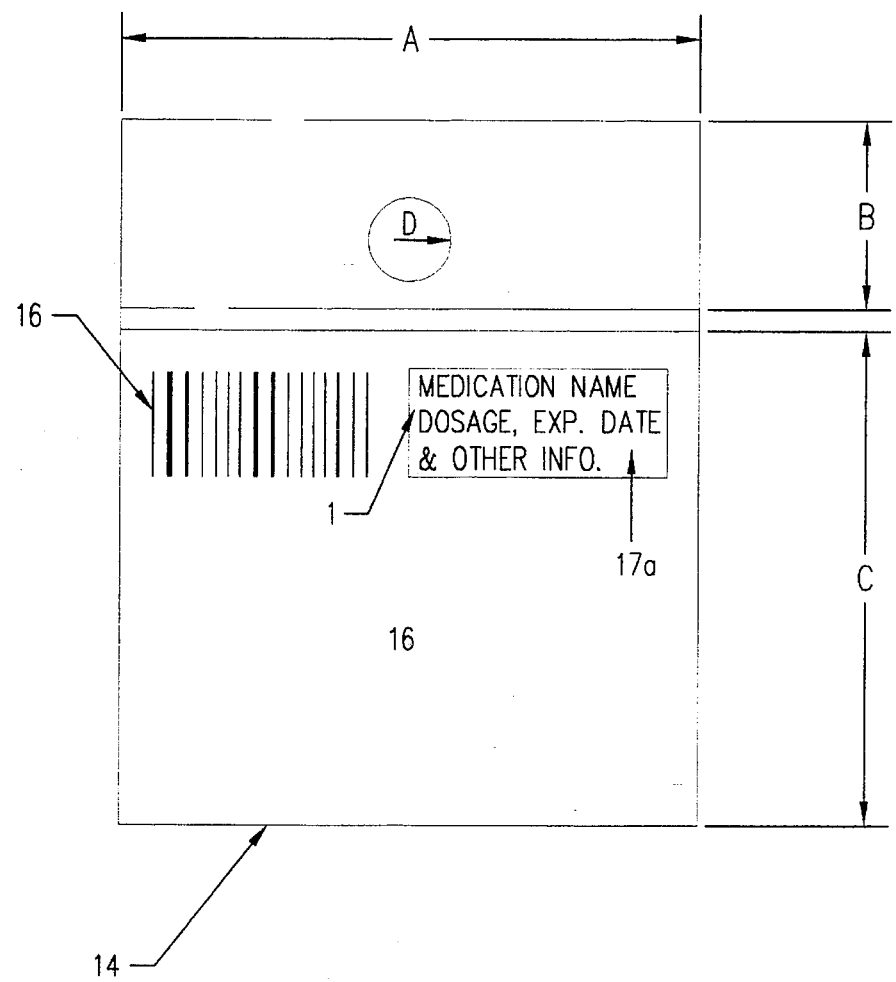
FIG. 2 is a side view of a present preferred package.

A present preferred package 14 is illustrated in FIG. 2. Although the package could be a blister card or box, we prefer to use a clear plastic bag having a hole 15 to permit the package to be hung on a rod 30, 48, 65 or 66 shown in FIGS. 3, 6 and 14. Each package preferably has a bar code 16 and a written description 17, which identify the contents of the package. A white area 17a can be created on the clear plastic bag over which the written description 17 can be printed, stamped or even handwritten. The bar code and the written description may include not only the name of the product, but also its quantity, weight, instructions for use and expiration date. We also prefer to position the bar code and label on the package so that there is a large unmarked area 62 through which one can see the contents of the package. FIG. 2 represents a clear plastic bag for a unit dose of medicine. We can use a bag having a perforation line for easy opening or a recloseable bag having an interlocking rib type seal. The perforation line or rib seal is located along line 13. This type of bag is useful in a hospital pharmacy which buys medicines in large or bulk quantities and must repackage the drugs in individual dose packages. Package 14 can be any desired size. We have used a rectangular package having dimensions indicated by arrows A, B, C and D, wherein A is 3.5 inches, B is 1.0 inch, C is 3.0 inches and D is 0.1875 inches. Alternatively, the package 14 can have A equal 5.0 inches, B equal 1.25 inches, C equal 5.0 inches and D equal 0.1875 inches.

An individual dose of medicine can be manually fed into an automated packaging system 98, as shown in FIG. 1, which automatically seals the package and prints a bar code and typewritten label directly on the package. In a preferred embodiment, we utilize the H-100™ packaging system as manufactured by Automated Packaging Systems of Twinsburg, Ohio. With the addition of the Accu-Print™ 100 Programmable In-Line Direct Transfer Imprinter, also manufactured by Automated Packaging Systems, a bar code can be printed directly on the medicine package.

A storage rack 12, which may also be used for a supply station, is shown in FIG. 3. This rack is configured to hold packages of the type illustrated in FIG. 2. The rack has a rectangular frame 28, having an open front and back. Running across the back are a plurality of back rod supports 32 from which the rods 30 extend. The frame 28 with rod supports 32 forms an X, Y coordinate system with each rod 30 and medicine packages 14 therein having a unique X, Y coordinate. Packages are placed in the storage rack so that each product is located at a known X, Y coordinate. Since every product is in a known X, Y location, it is possible to direct an automatic picking means to any product location to select a desired item. The packages are segregated within the storage rack so that all packages in any given location have the same contents.

Although we prefer to use racks in which packages are hung on rods, other types of racks can be used for storage racks and supply stations in our system. In FIG. 4, we show the upper portion of a rack having a rectangular frame 21 with an open front and closed back 23. Attached to the back 23 are sets of brackets 25 positioned to hold packages 27. To be held securely in this rack, such packages must be fairly rigid. Blister cards and boxes can be used. If desired, a hole 15 could be provided in the packages to permit them to be carried on a rod.

A top portion of another suitable rack having a rectangular frame 21, open front and closed back 23 is shown in FIG. 5. This rack has a set of shelves 29, which may be inclined toward back 23. A set of dividers 31 separates groups of packages 27.

The racks of FIGS. 3, 4 and 5 have two important common features. First, the packages are held in locations having known X, Y coordinates. Those coordinates could be single X, Y values as may correspond to the position of the package holes 15 or a group of X, Y values defining an entire package. Second, there is sufficient clearance between packages to allow automated picking means to select, grab and replace individual packages.

Figure 6:
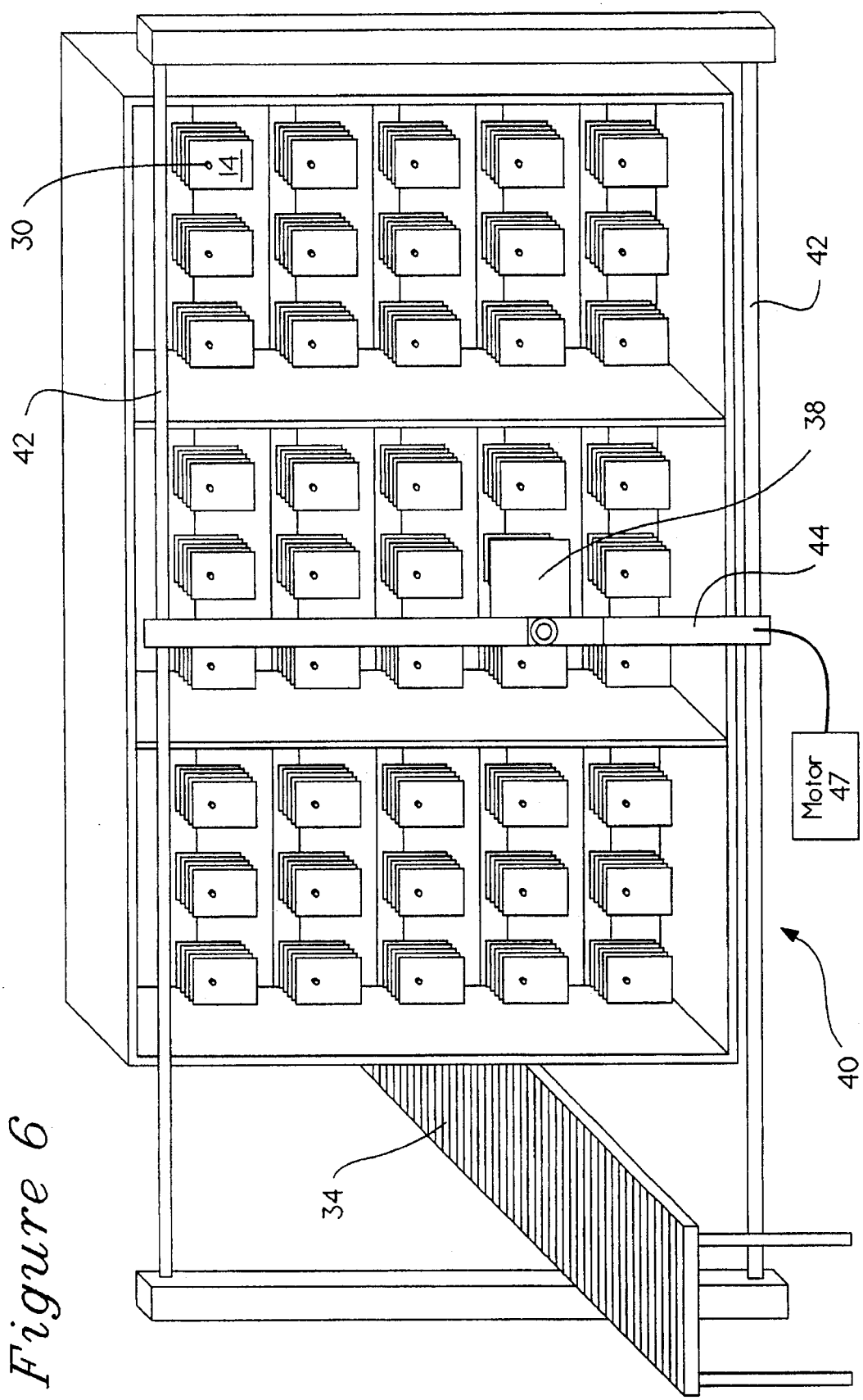
FIG. 6 is a schematic representation showing the storage rack, conveyor and movable support structure which holds a gripper assembly.

Referring now to FIGS. 1 and 6, we provide storage racks 12 on either side of a track 42 over which a vehicle 44 may travel. The vehicle may be column-shaped as in FIG. 6. Many types of drive systems could be used to propel the vehicle. For example, one could provide a motor indicated by block 47 to propel wheels (not shown) at the base of the vehicle. Alternatively, one may use a chain or cable running through the track 42 to pull the vehicle to any desired location. Whatever drive system is used should be capable of moving the vehicle to positions along the track which correspond to the X coordinates of the packages within the rack. Thus, computer 24, which controls the drive system, can direct the vehicle 44 to a location in front of the package or packages to be selected.

Figure 7:
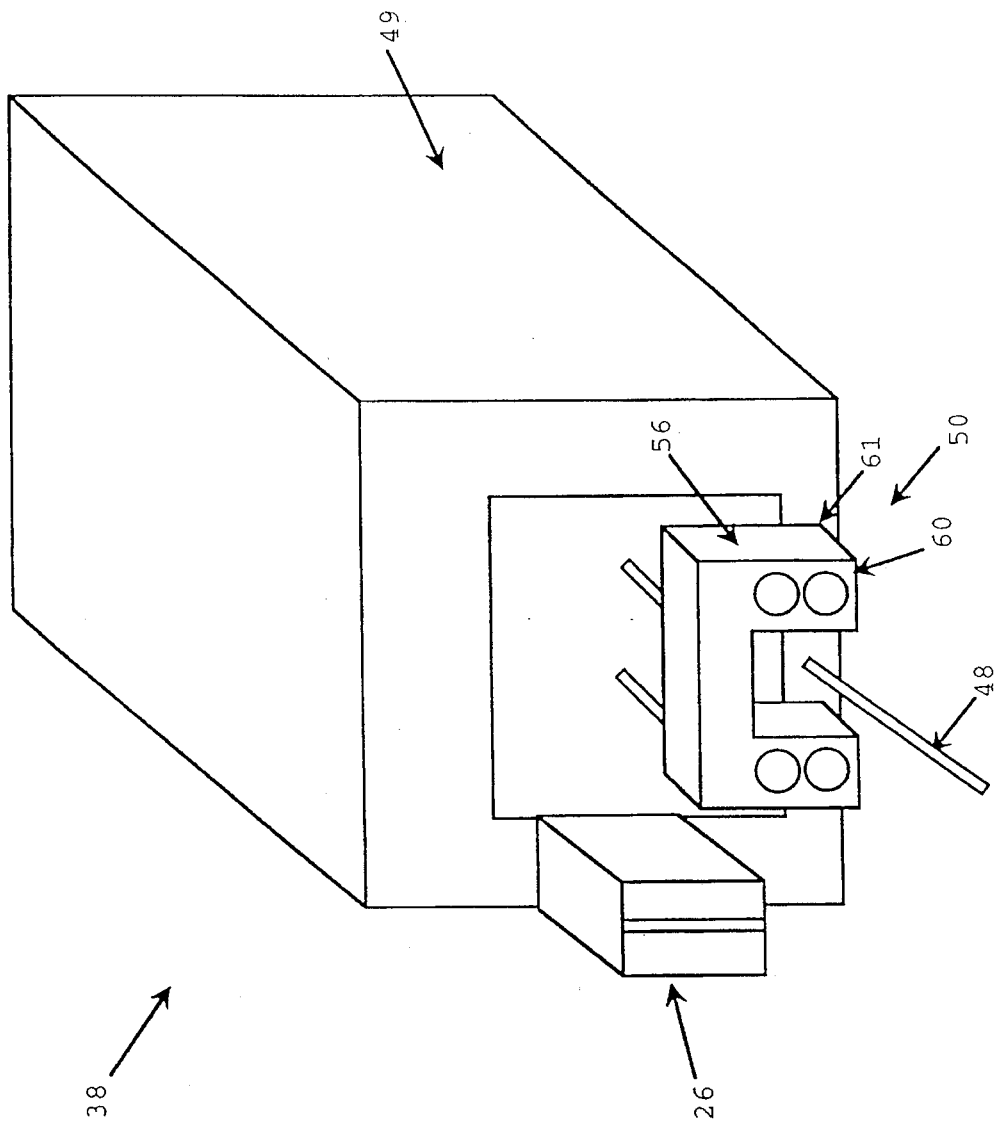
FIG. 7 is a schematic view of a present preferred gripper assembly.

Packages are selected by a picking means 38, preferably of the type illustrated in FIGS. 7 though 10. The picking means is mounted on column-shaped vehicle 44 in a manner to allow controlled vertical movement along that column. In this manner, the picking means 38 can be positioned at locations along column 44 which correspond to the Y coordinates of packages to be selected. The picking means 38 is controlled by a computer 24, or local area network of computers, having a database. The database has the order to be filled and a record of the predetermined locations 18 of each different product in the storage rack 12. The computer 24 guides the picking means 38 based on information contained in the database, such that the picking means 38 picks a package 14 according to the order to be filled. The picking means 38 can also include means, such as a bar code reader 26 as shown in FIG. 7, for determining the identity 16 of a package 14 in the storage rack 12 or in a supply rack 20 and providing its identity 16 to the computer 24. The computer 24 guides the picking means 38 to select the desired packages and deliver them to a desired location. In the system of FIGS. 1 and 6, the packages are delivered to containers 36 located on conveyor 34. When the system is installed in a hospital pharmacy, the containers 36 are ndividual patient boxes in which the patient's medication is delivered from the pharmacy to the appropriate floor or nurses' station. The patient boxes preferably are bar coded with a patient identification code. After a patient's prescription is filled and the patient box 36 has all the medicine packages called for in the prescription, a conveyor belt 34 moves the patient box 36 to a check station 80. An operator uses the check station bar code reader 82 to scan the bar code label on the filled patient box 36, see FIG. 15. The patient identification number is taken from the inputted bar code and the prescription of the patient is displayed on the check station screen 84 of the check station console 86 connected to the computer or network of computers 24. The operator then scans individual medicine package bar codes in the patient box 36. The identity of the medicine packages 14 in the patient box 36 is automatically checked for correctness with respect to the patient list on the station screen 84. If the medicine packages 14 in the box 36 are correct, then the patient box is allowed to continue on towards the ultimate destination and the next filled patient box 36 is then checked. If the medicine packages 14 in the patient box 36 are not correct, then it is determined whether the error, whatever that may be, can be corrected. If the correction can be made, then the record on the check station screen 84 is corrected and the procedure for verifying correctness is then repeated. If the problem cannot be corrected, then the patient box 36 can be manually filled or resubmitted to be filled with missing doses by the system and the computer is notified that the patient's prescription has not yet been filled.

In the event that a patient does not take all of the medicine which has been prescribed, unused medicine is returned to the hospital pharmacy in the patient box 36. Typically, patient boxes are transferred in a carrier which contains several patient boxes. This carrier is received at a return station 92. The patient box 36 is first removed from the carrier returned from a nursing unit. An operator uses the return station bar code scanner 91 to scan the bar code on the patient box 36. The nursing unit number and the patient identification number is then parsed from the inputted bar code of the patient box 36. The database is then accessed and the patient dispensing record is retrieved. On the return screen 94, there is displayed for a particular patient at the operator console 96, a list of the medicines ordered and dispensed to the patient. The operator of the return station 92 then scans the identity 16 of the medicine in the patient's box 36 with the return station bar code scanner 91. The medicine packages 14 that are found thereon are verified as being dispensed to the patients. The expiration date of the medicine in the medicine package 14 is then determined. If the expiration date of a medicine in the medicine package 14 has passed, then the medicine package is discarded. If the expiration date has not passed, then the returned medicine package 14 is placed in the supply rack 20. If there is more medicine to be returned, the process is then repeated. If there is no more medicine in the patient box 36 to return, then the return station console 96 is checked to verify the correctness of the medicine returned. If the screen is correct, then the return record is accepted and the database is updated. If the screen 94 is incorrect, then the screen is corrected to correspond to the returned medicine packages 14 and the patient box 36. In this manner, the system will have developed a record of all medication given to each patient. That record can be transferred to a hospital billing system and used for billing purposes. The data can also be input into an inventory monitoring system and used to generate reports or orders for new supplies.

We prefer to provide supply racks 20 which serve as a holding area for returned and new products. These racks are comparable to storage racks 12 and are accessed by the picking means 38 in the same manner. However, products are randomly placed in the supply racks either manually or by the picking means. The supply racks 20 are shown in FIG. 1 at a position where they are accessible to the picking means. However, we prefer that the supply rack be movable. Then it could be moved to other convenient locations, such as near packaging system 98 for refilling.

When packages 14 are to be restocked onto the storage racks 12, the supply rack 20 is placed in a predetermined position alongside the storage racks 12. By being placed in a predetermined position, the X and Y coordinates at which packages may have been placed in return racks 20 are known to the computer 24. Picking means 38 is then positioned for a given package in the return rack. The bar code reader 26 on the end of picking means 38 then scans the identity 16 of the package 14 that is about to be picked. The process of picking the returned packages 14 is the same as occurs with respect to the process of obtaining packages 14 from the storage rack 12. The only difference is that the order of the packages 14 and their identity as they are picked is saved in the computer 24. When the picking means is then moved to the storage racks 12 the computer knows the identity of the respective medicine package 14 on the picking means 38, which is about to be placed back onto the storage racks 12.

Figure 11:
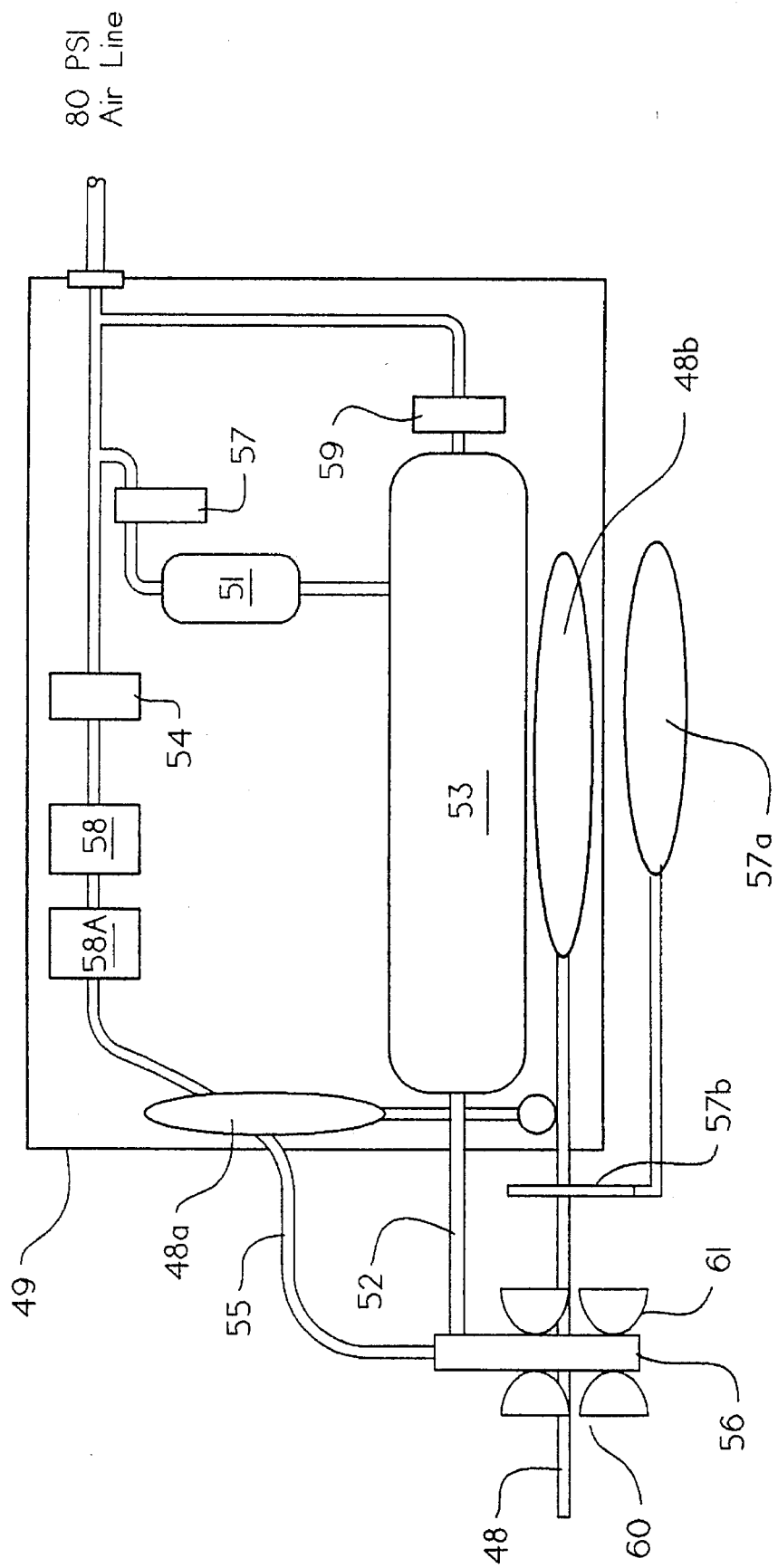
FIG. 11 is a diagram showing a preferred vacuum and pressure line for the gripper assembly.
Figure 12:
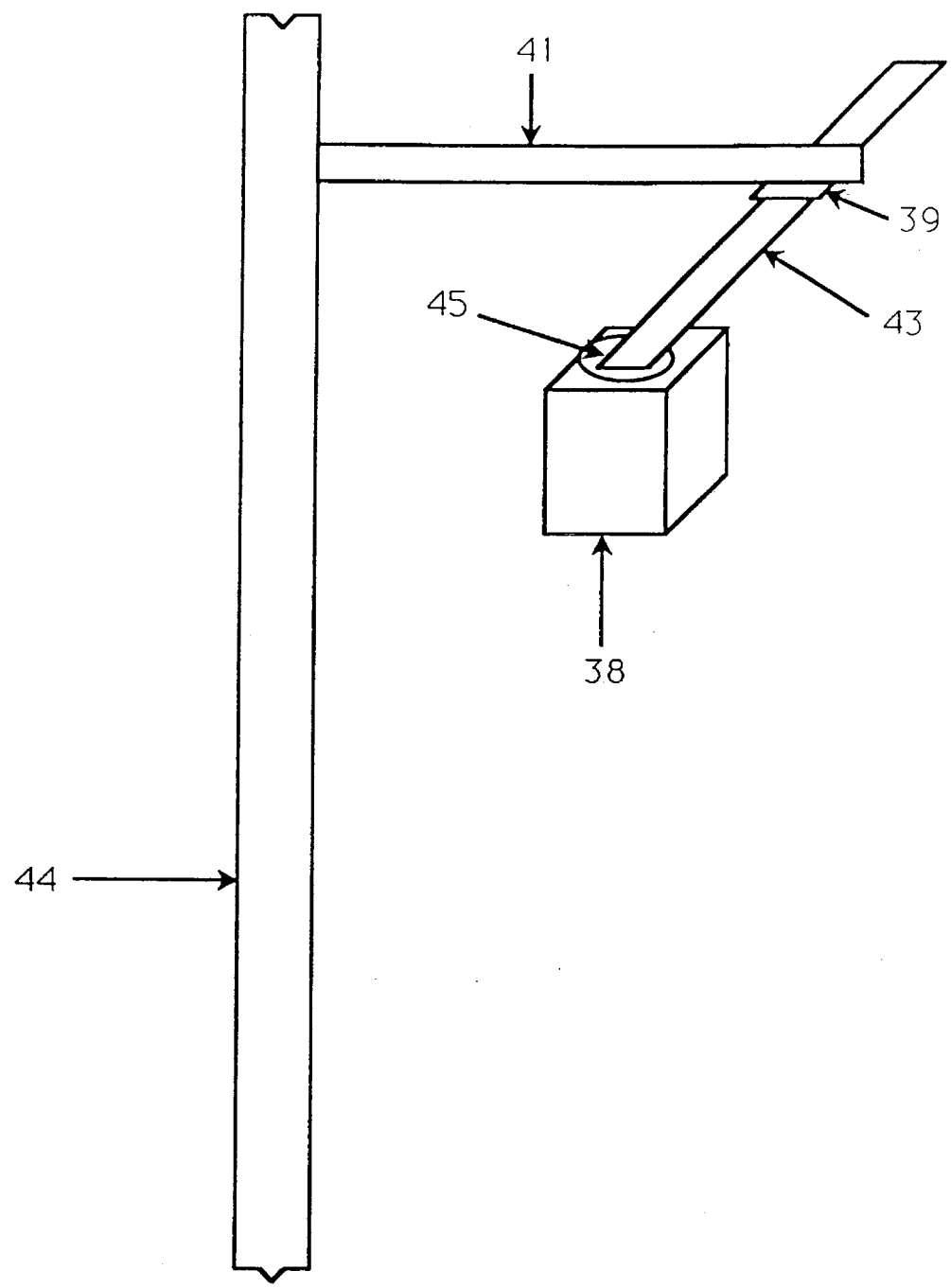
FIG. 12 is a schematic representation of the gripper assembly mounted on a vehicle.
Figure 13:
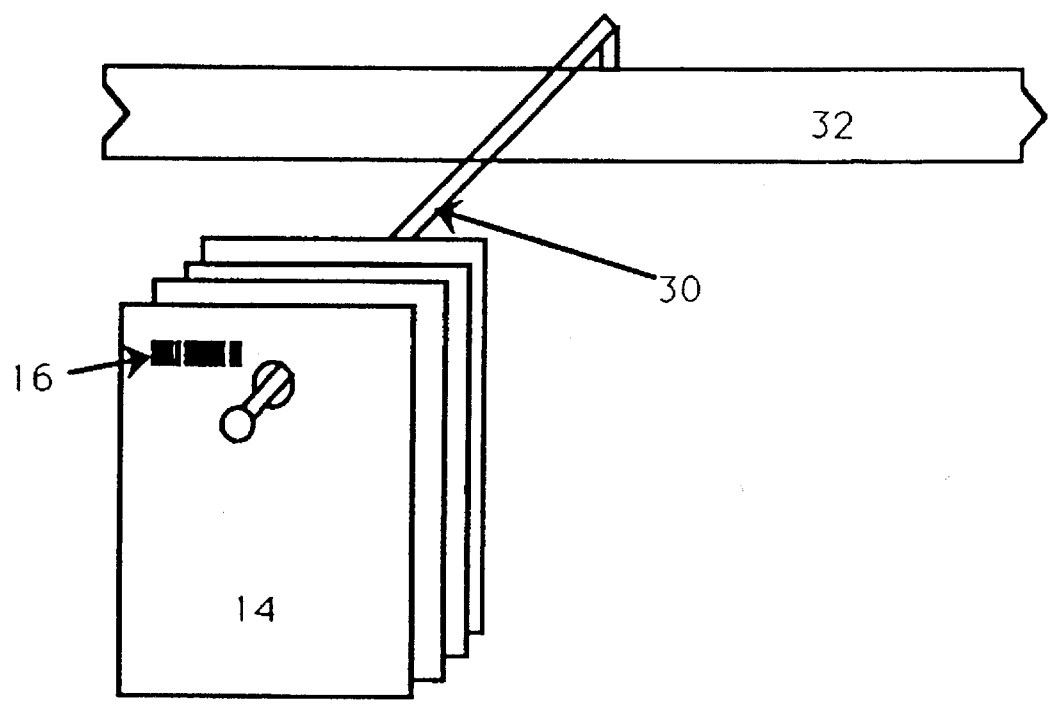
FIG. 13 is a perspective view of a rod with packages thereon connected to a support bar.

The picking means 38 includes at least one gripper assembly illustrated in FIGS. 7 through 12. As shown in FIG. 12, we prefer to provide a support bracket 41 extending from column 44. This bracket can move along column 44 in a vertical direction. A third actuator 43 is attached to bracket 41. Mounting 39 permits movement along rod 41 and movement at bar 43 in a direction normal to rod 41. A picking means 38, which preferably is the gripper assembly of FIGS. 7 through 10, is mounted to actuator 43 through actuator 45, which permits a 180-degree rotation of the gripper assembly. Actuator 43 permits horizontal movement of picking means 38 in the Z direction.

Figure 8:
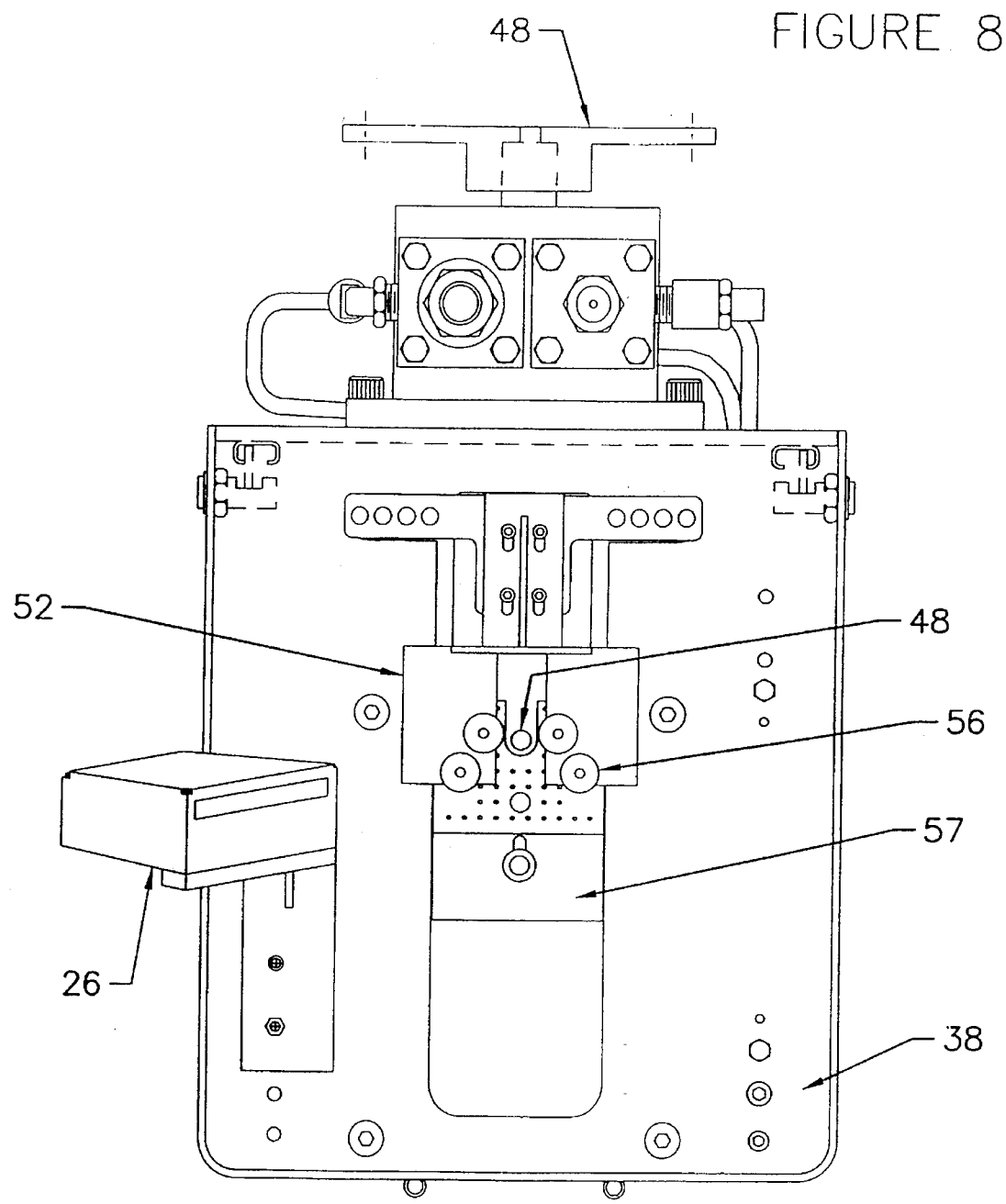
FIG. 8 is a front view of a present preferred gripper assembly.
Figure 9:
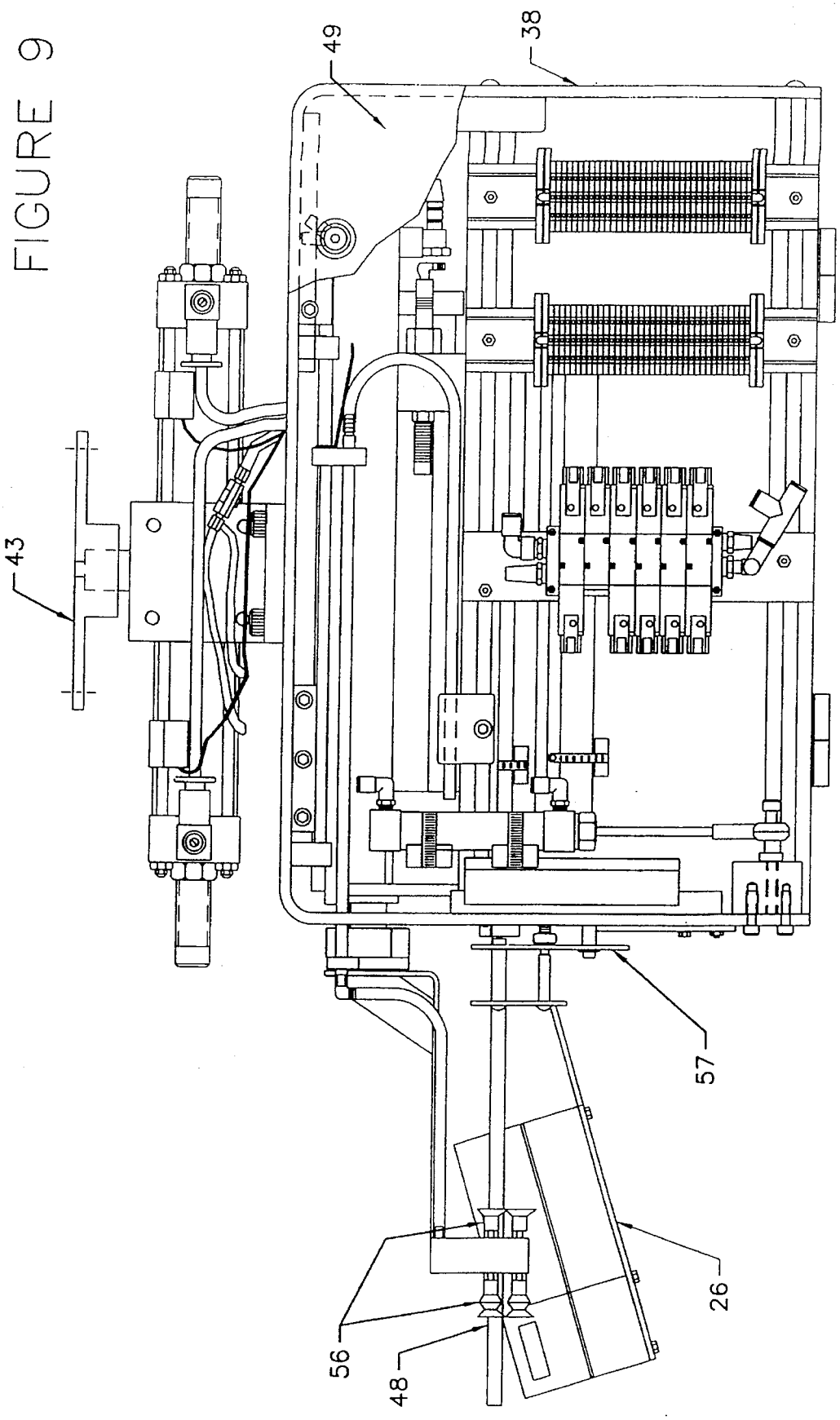
FIG. 9 is a side view of the gripper assembly of FIG. 7 with the storing rod in a raised and extended position.
Figure 10:
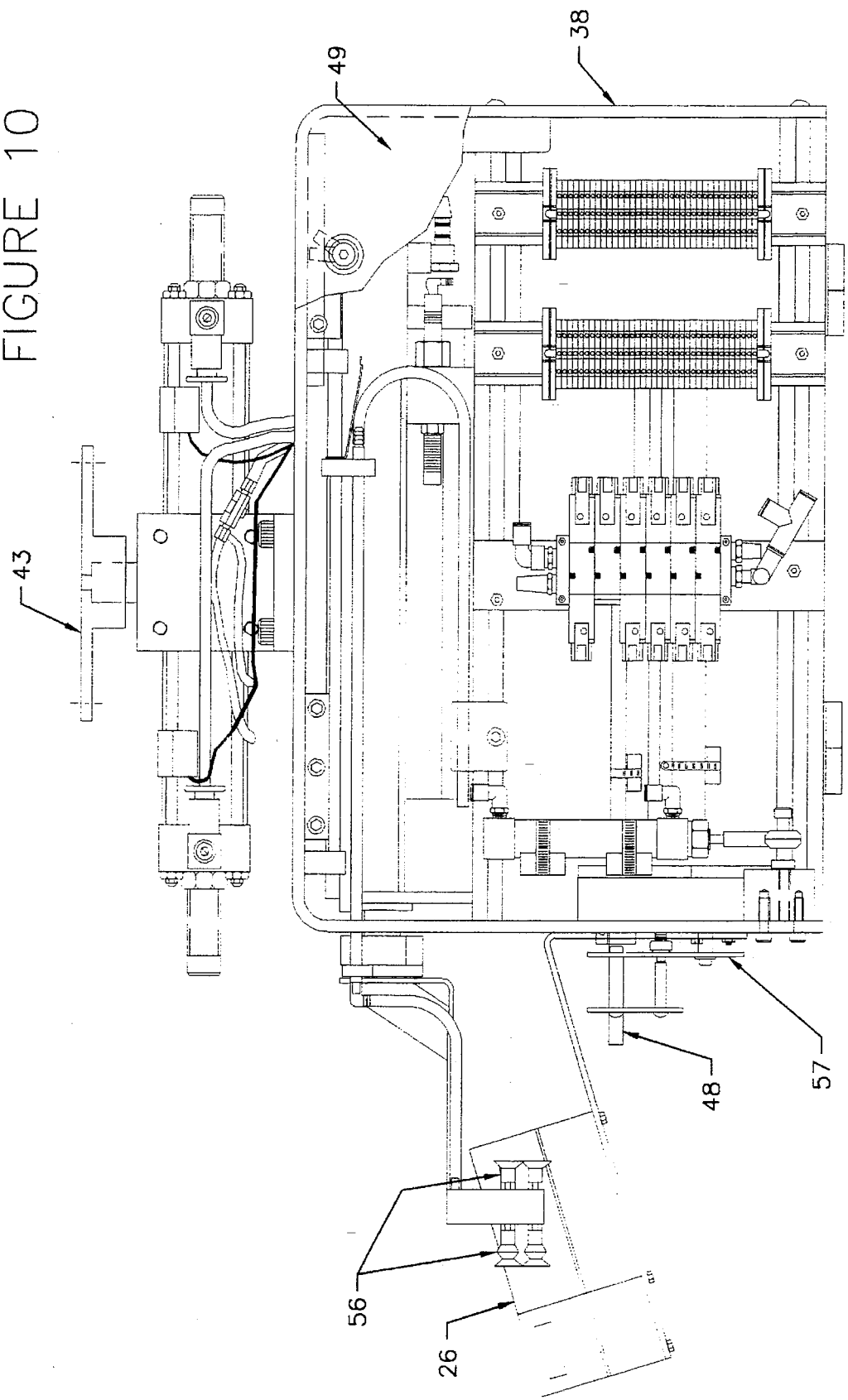
FIG. 10 is a side view of the gripper assembly of FIG. 8 with the storing rod in a lowered and partially retracted position.

The gripper assembly is preferably comprised of a housing 49, as shown in FIG. 7 having means for storing medicine packages 14, such as a storing rod 48. Assembly 38 also contains means 50 for obtaining a package 14. The obtaining means 50 is slidingly attached to the housing 49 such that it can move in a Z direction, which is perpendicular to the X, Y directions, to pick a package 14 from a support rod 30 in the storage rack 12 or supply rack 20. Identifying means, for example, the bar code reader 26 shown in FIG. 8, is mounted on housing 49 such that it can identify a package 14 to be picked by the obtaining means 50. The obtaining means 50 preferably includes means for producing a suction, such as a vacuum generator 58 controlled by a vacuum sensor 58a which draws a vacuum through vacuum line 55 and vacuum valve 54. The obtaining means 50 also preferably includes an extension rod 52 in fluidic communication with a pneumatic in/out cylinder 53 and associated valve 59, as shown in FIGS. 8 and 11. The extension rod 52 is slidingly attached with respect to the Y and Z directions to the housing 49. A suction is maintained through the vacuum lines 55 when the vacuum valve 54 is activated to supply air to vacuum generator 48. The obtaining means 50 also can include a suction head 56 connected to the extension rod 52 through which a package is picked with suction. The vacuum sensor 58a will sense when a package is properly positioned on the suction head 56, for example, by detecting air flow therethrough. The suction head 56 and carried package are then moved to the storing means, such as the storing rod 48, to deposit the package thereon. Preferably, the storing means is a storing rod 48 which extends from the housing 49 such that the suction head 56 and the extension rod 52 can deposit a package 14 thereon. The obtaining means 49 is also composed of a cylinder 48A which allows an assembly of both holding rod 48 and pusher plate 57 to move in the Y direction. The holding rod 48 is also attached to a cylinder 48B which allows the storage rod to retract and extend in reference to the obtaining means. The pusher plate 57B is also attached to a cylinder 57A which allows the plate to move in the positive Z direction. This action is necessary to push drugs off of the storage bar 48 during the dump process.

The extension rod 52 can move in the Y and Z directions to place a picked package on the storing rod 48 under the action of up/down cylinder 51 and in/out cylinder 53. Valve 57 activates cylinder 51 to move both the cylinder 53 and the extension rod 52 in the Y direction. Valve 59 activates cylinder 53 to move the extension rod in the Z direction. Valve 54 provides air to the vacuum generator 58 to suction in head 56 sufficient to pick a package from a rod 30 of the support structure 28 and then hold it to the suction head 56. The suction head 56 preferably has two faces 60 and 61 through which suction can be drawn. One face 60 is capable of picking a package from a rod 30 of the storage rack and the other face 61 is capable of picking a package from a storing rod 48 of the picking means 38. As shown in FIG. 2, each package preferably has a face 62. The packages are held by the storing rod 48 and the rods 30 of the support structure 38 such that the face 62 of each package is parallel to the Y axis. The outside face 60 is utilized when a package 14 is being removed from a rod 30 in the supply rack, and the inside face 61 is utilized when a package is being removed from the storing rod 48 of the picking means 38.

Figure 14:
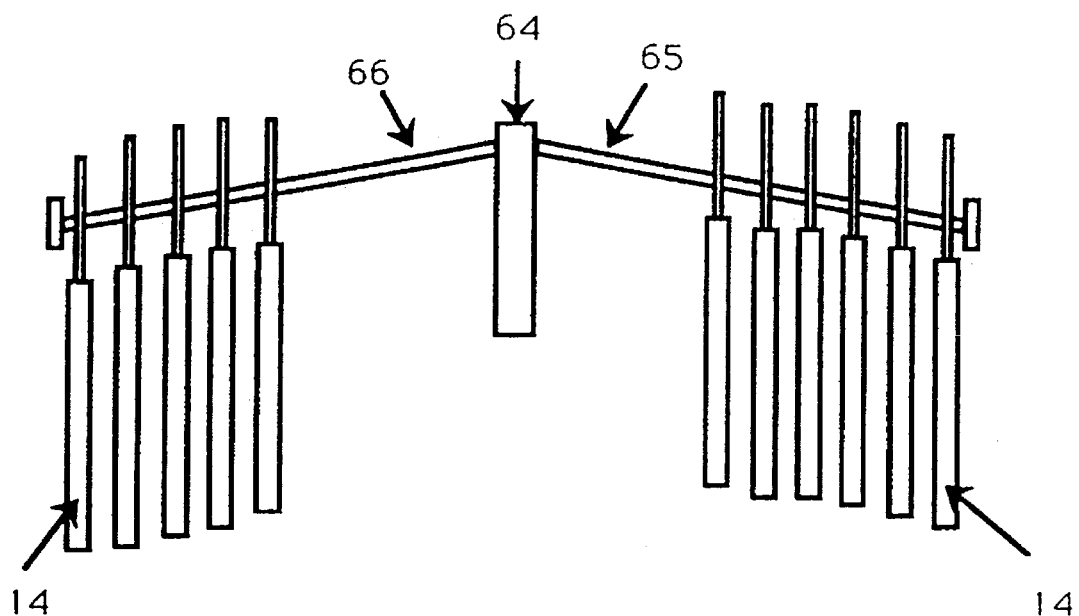
FIG. 14 is a schematic representation of a side view of a first rod and a second rod and having packages thereon attached to a portion of the support bar.

In an alternative embodiment, the rods 30 extend from the double rod support bar 64 n sets of two as shown in FIG. 14. A first rod 65 and a second rod 66 of each set point essentially in the Z direction, but approximately 180 degrees apart from each other. This embodiment shown in FIG. 15 includes a first tooling support structure 70, a second tooling support structure 72, a first end of arm tooling 67 and a second end of arm tooling 68 that picks the packages 14. Each tooling support structure has at least one column type vehicle 44 and at least one track 42 to support the column 44. Column 44 moves along the respective tracks 42 to pick a given package 14 from a corresponding support rod 30, or restock a support rod 30 with an associated package 14.

In the operation of the preferred embodiment in a hospital, doctors visit patients in nursing units and write out medication orders for each patient. A patient is typically placed on a certain medication treatment which requires multiple doses of medication over a period of a day. Some medications are administrated at certain times of the day and possibly at intervals of several hours. Patients may also request certain medications on an elective basis for disorders such as headaches. These requests are included in the doctor's order that is sent from the nursing unit to the central pharmacy of the hospital. Once an order is received by the pharmacy, it is checked by registered pharmacists and input into the pharmacy information system. These orders reflect not only orders that are added to a particular patient's treatment, but changes in the medication treatment. The pharmacy information system combines this information with the patient's existing medication schedule and develops a patient medication profile. A fill list is generated from that profile. The fill list is a list of all the medications that must be distributed to all patients for the day. This information is sent to the pharmacy printer where a hard copy is generated.

Means for communication between the pharmacy information system and the present system exist by either tapping the serial data print stream of the pharmacy information system or by a direct bi-directional communication link. The relevant information concerning the patient including drug type, dosage and frequency is placed in the database of the system. The database contains information about which drugs are to be dispensed that day to the patient and all drugs that have been dispensed in the past to the patient. Information from the pharmacy information system is received on an ongoing basis throughout the day. New information can be entered into the database at any time. In addition to the fill list, new orders and patient admittance, discharge and transfer information are received and stored.

Figure 16:
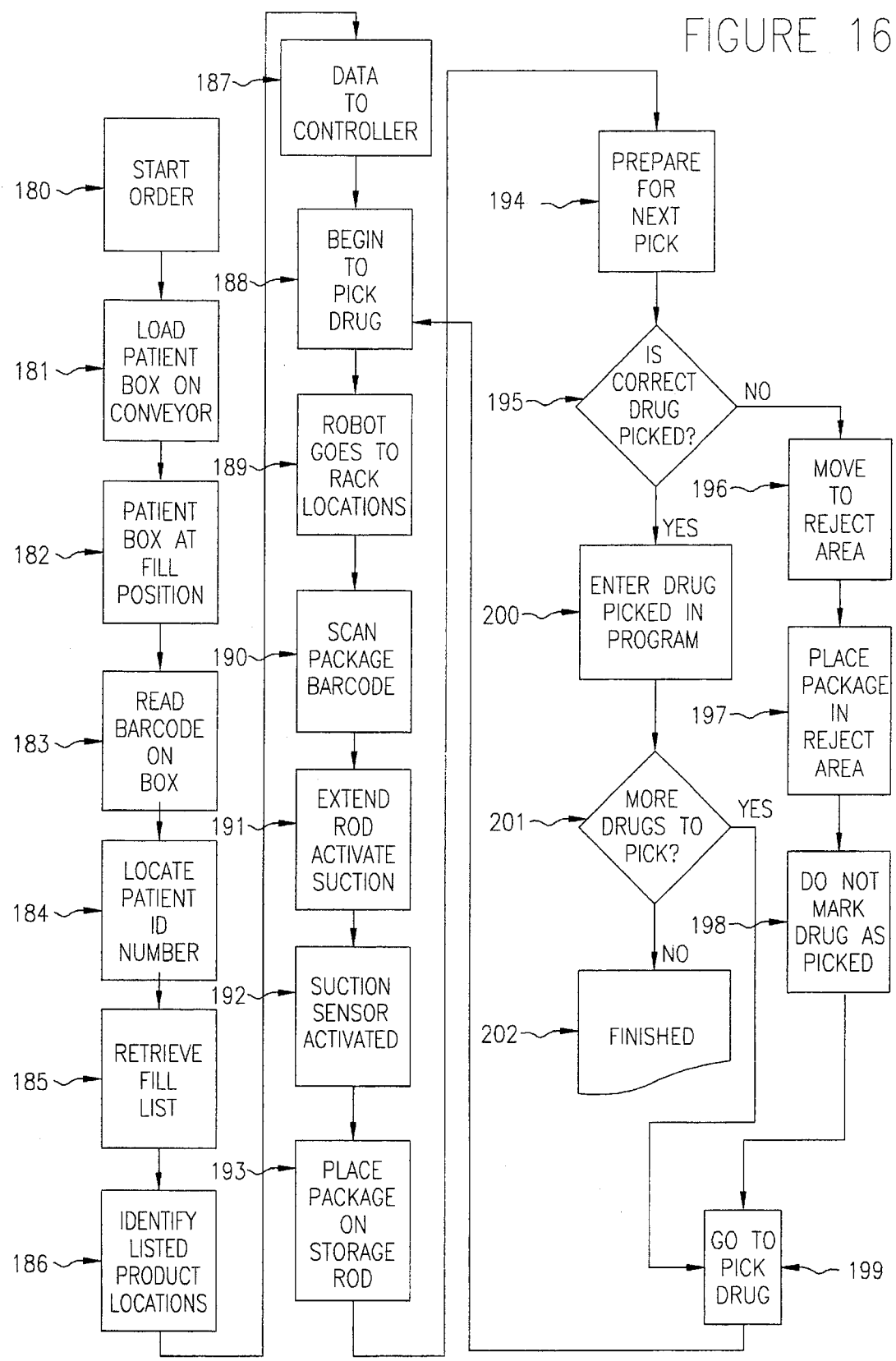
FIG. 16 is a flowchart of the filling process.

FIG. 16 is a flowchart with respect to the processing of a patient prescription. A similar method would be followed for retrieving other stored products. The software for processing an order is started as indicated by box 180. Then the steps indicated by boxes 181 thru 202 are followed. Before a box is loaded onto the conveyors, the operator scans the location barcode and the patient barcode on the patient box. The system then checks its database to ensure that that patient is still at that location. If a new patient has been transferred or admitted to that location, the system automatically generates a barcode label with that patient's identification number on it. This label is then manually applied to the patient box and the box is placed on the conveyor. If no patient is registered in the room, the box is placed aside and the operator proceeds with the next patient box to be filled. When the turn comes for the patient box 36 to be filled, it is shuttled into a position on the conveyor 34 such that the gripper assembly 38 can communicate with the box 36 as shown in FIG. 1. A stationary bar code reader 90 reads the bar code on the patient box 36. The patient identification number is then parsed from the bar code input. This causes the fill list for that particular patient to be retrieved from the database as indicated in box 185. The fill list is converted to data consisting of locations and number of picks. At box 187 the data is then downloaded to a robot controller or gantry control program in order for the computer 24 to control the end of arm tooling 38 such that it knows what packages 14 to obtain and place in the patient box 36.

The system is now ready to pick the drugs 188. First, the column-type vehicle 44 goes to the rack where the drug to be selected is stored and stops at the X coordinate of that drug package. The picking means 38 then moves along the column 44 to the Y coordinate of the medicine package to be picked. It is also turned to the proper storage rack 12 which has the desired package 14. These actions may also be performed simultaneously by the system 189.

When the end of gripper assembly 38 is properly positioned, the bar code reader 26 reads 190 the identity 16 on the medicine package 14 in order to confirm that it is the proper medicine package to be picked with respect to the patient's prescription. After such confirmation the suction rod 52 extends in the Z direction by pneumatic cylinder 53 such that the outside suction face 60 contacts the package face 62. Valve 54 activates a suction through the air lines 55 such that a suction drawn through the suction face 60 grabs the medicine package 14 sensor 58a detects when the contact is proper between the suction face 60 and the medicine package 14, as indicated at box 192 of FIG. 16. Then the extension rod 52 retracts from the rod 30 of the support structure 28, pulling the medicine package 14 with it. Once the medicine package 14 is clear of the rod 30, the extension rod 52 positions the medicine package 14 that it has obtained, upon the storing rod 48 as indicated by box 193.

The system now prepares for the next pick. This operation is indicated by box 194 includes several actions. Once the package 14 is on the storage rod 48, the vacuum valve 54 terminates the suction and the medicine package is released from the suction face 60. The vacuum valve 57 then activates the cylinder 51 such that the extension rod 52 (and cylinder 53) are moved in the Y direction so the bottom of the suction head 56 is above the package 14 on the storing rod 48. The extension rod is then moved forward in the Z direction and downward in the Y direction by the respective valves and cylinders to clear the package and position the suction head 56 for the next pick. In an alternative embodiment the storage rod 48 is moved down rather than moving suction head up 56 to provide clearance between them when the suction head moves in a Z direction. The computer 24 then notes that the medicine package 14 with the appropriate medicine has been picked.

The final series of operations indicated by boxes 195 thru 202 involves a comparison of the drug identified by the reader as having been picked with the list of drugs to be selected. If an incorrect drug was selected the gripper assembly moves to a reject area, places the incorrect drug there, removes that drug from the list of items selected and is ready to pick more drugs. If the correct drug was selected the system records that fact and is ready to pick more drugs. The process is repeated for all the medicine identified in the patient's prescription until all of the medicine packages 14 needed have been picked.

The gripper assembly containing all desired packages then positions itself so that it is over the patient box 36. The gripper assembly 38 then positions the outside suction face 60 behind the medicine packages on the storing rod 48 that have been collected. Packages can be dropped into the patient box by retracting rod 48 by actuating cylinder 48A to the position shown in FIG. 10. The storage rod 48 is then moved into the negative Z direction so that the suction face no longer holds the packages in place. The cylinder 48B then causes the storage rod 48 to be retracted which will cause the drugs to be dumped into the box.

Alternatively, the suction head may be stroked forward in the Z direction so that all packages 14 are pushed off the storing rod 48 into the patient box 36. Movement of the suction head is accomplished by the vacuum system. Vacuum valve 57 activates the cylinder 51 to retract in the positive Y direction such that the bottom of the suction head 56 is above the tops of the packages 14 on the storing rod 28. Then vacuum valve 59 activates cylinder 53 to retract the extension rod 52 in the negative Z direction such that the outer suction face 60 is behind all of the medicine packages 14 on the storing rod 48. Vacuum valve 57 is then activated such that the suction head 56 is dropped back down in the negative Y direction to be behind the packages 14. Finally, vacuum valve 59 is activated such that the extension rod 52 is extended in the positive Z direction and the front suction face 60 pushes all packages 14 off the storing rod 48 into the patient box 36.

In the event that the wrong medicine package 14 was scanned and is picked, or the medicine has expired, then picking means 38 will have placed those packages in a reject or return area, where the medicine package 14 can be disposed. A pharmacy technician will then manually sort the drugs in the reject area, removing expired drugs and placing the others in the supply rack in order that they might be returned to their correct location in the system. The process is then repeated for the next drug on the prescription list that has not yet been obtained.

Figure 17:
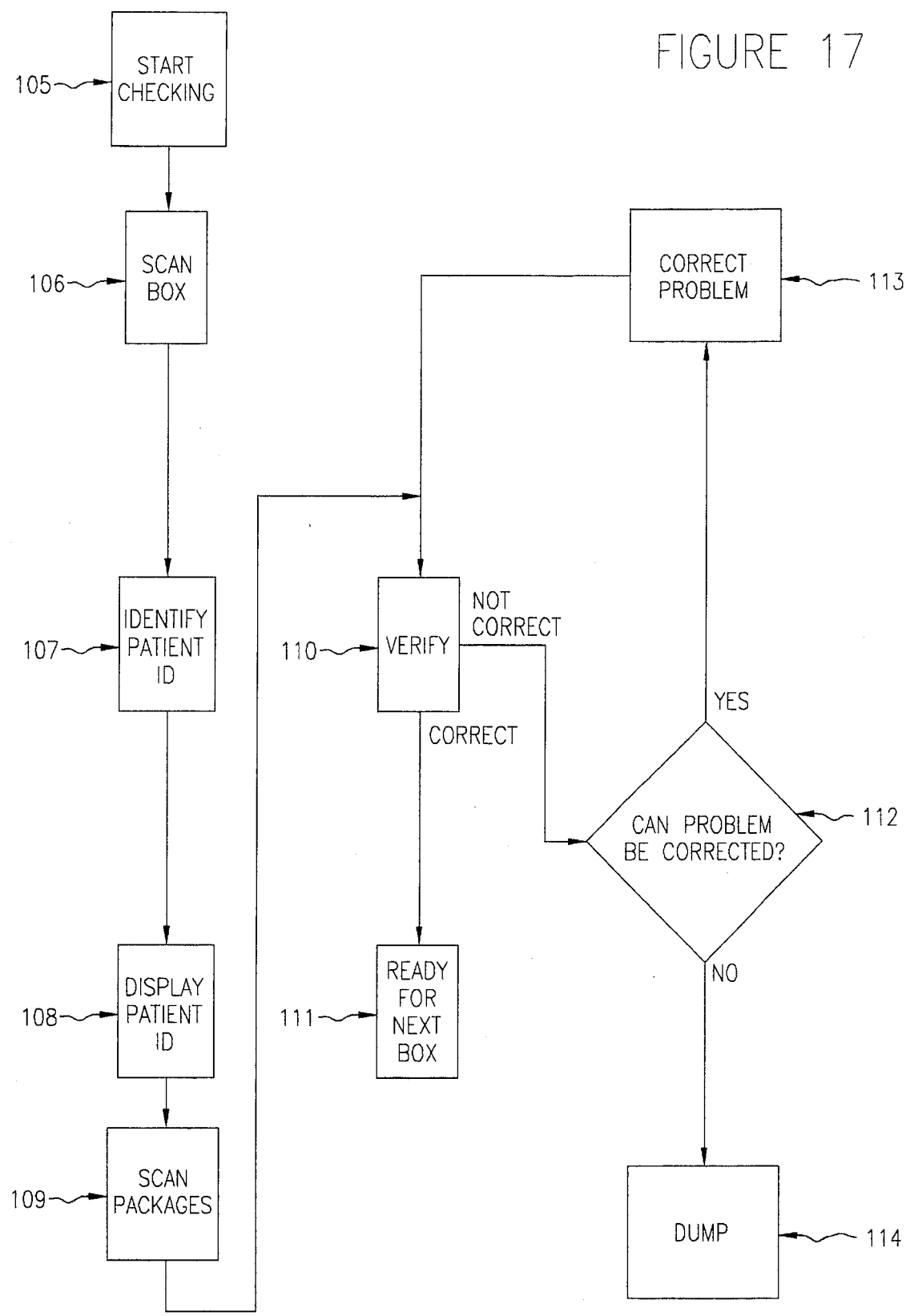
FIG. 17 is a flowchart of the check process.

The flow chart of FIG. 17 is the process of checking the selected packages which have been placed in a patient box. Such checking is performed at the check station. The process begins by calling up the check program indicated by box 105. The bar code on the patient box is scanned 106 and the patient number portion of the bar code is identified 107. The patient number is displayed 108 on the screen at the check station. Then the packages in the patient box are scanned 109. The identification of the packages is compared with the list of drugs that had been ordered for the patient in a verify step 110. If correct packages are in the box, the checking of the box is complete and the system is ready for the next box 111. If the packages in the box do not match the order the system determines if the problem can be corrected 112. If so, the correction is made 113 and the verify step is repeated. If not, the box is dumped 114 and the order is recorded as not filled or the box is resubmitted and the missing medications are filled by the system. For example, should the system determine that an item is missing it may either create a modified list and send the box on with a modified list or it may instruct the picking means to get the missing item.

Figure 18:
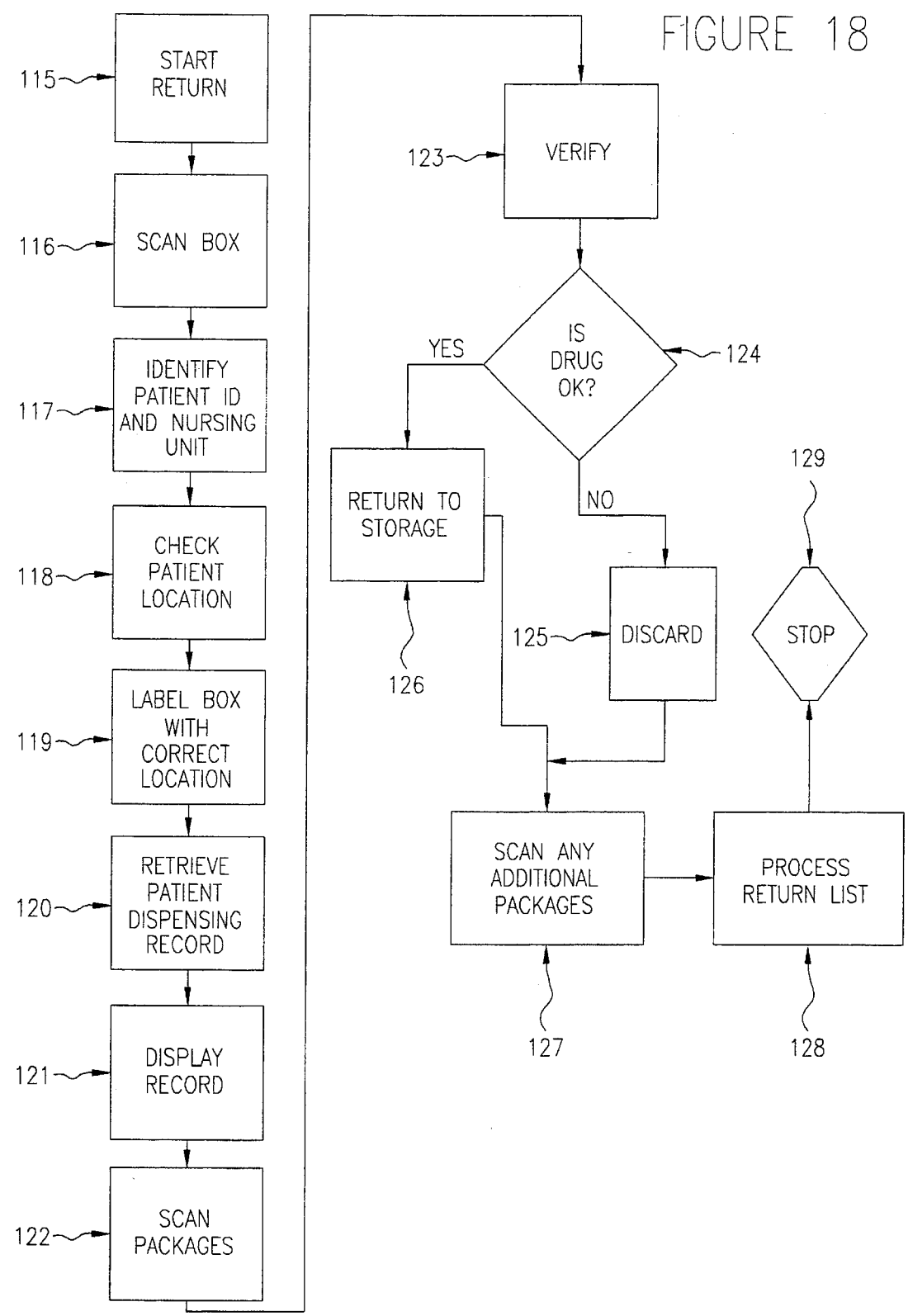
FIG. 18 is a flowchart of the return process.

The return process is shown in the flow chart of FIG. 18. The process starts 115 by calling up the return program. The patient box containing the returned items must be positioned so that the patient box can be scanned 116 for the patient identification number 117 and the nursing unit from which the box was returned. If the box has come from the proper nursing unit the system retrieves the patient dispensing record 120 and displays that record 121 for the operator. Next the packages are scanned 122. The system preferably verifies 123 that the scanned packages had been sent to the patient making the return. Next the system checks each package 124 to determine if the drug is useful or if it has expired, been recalled or otherwise should not be returned to the supply rack. If no, the package is discarded 125. If yes, the package is returned to the supply rack 126. If more drugs remain in the box the process is repeated 127. If no packages remain, the system may further process the list of returned packages 128 to modify the patient's record, update the system inventory log or display the list of returns for review by the operator.

Figure 19:
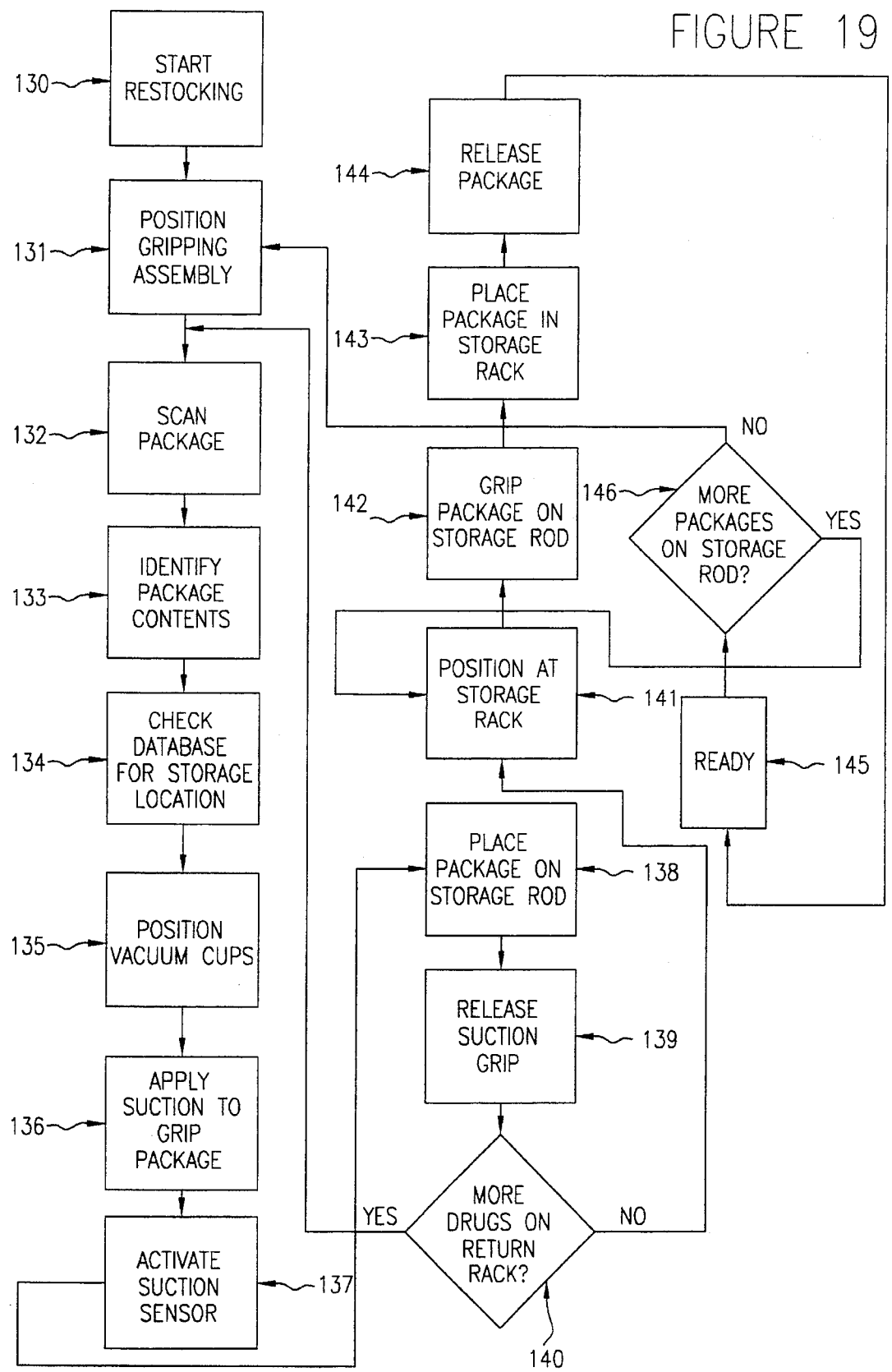
FIG. 19 is a flowchart of the restocking process.

The process of restocking returned or new packages to the storage rack is diagramed in FIG. 19. These packages are manually placed on a return or supply rack and the program for restocking is called up 130. The program causes the picking means to be positioned 131 so that the gripping assembly can pick packages from the return or supply rack. The bar code on the first package is scanned 132 and the portion of the scanned bar code which identifies the drug is found 133. The system then checks the database 134 for the location in the storage rack which has been designated for the identified product. The system extends the vacuum head 135 to engage the package. Suction is applied 136 and a suction sensor is checked. This should cause the package to be held by the gripper assembly which fact will be confirmed by the sensor 137. The gripper assembly positions the package 138 on the storage rod 48 in the gripper assembly. Then the suction is released and the gripper assembly is ready to place additional packages on the storage rod. If more packages remain on the return or supply rack 140, the process is repeated until all packages are on the storage rod or the storage rod is full. The gripper assembly is then moved to a position 141 in front of the storage rack to properly place the outermost package on the storage rod. That package is grasped 142 using back suction cups 61 (see FIG. 11). The extension rod 52 is retracted in the negative Z direction such that the inside suction face 61 is in contact with the medicine package 14. The sensing means 58 determines whether proper contact is made. Then the extension rod 52 is moved a predetermined distance in the positive Z direction 143 to place the medicine package over a rod 30 of support structure 28. Vacuum valve 54 is then deactivated 144 to stop suction, allowing the medicine package 14 on the suction face 61 to drop away therefrom. The extension rod 52 then moves in the negative Z direction towards the medicine packages 14 on the storing rod 48 to repeat the process. While it moves back to obtain another medicine package 14 the sensor 58 trips when contact is made. The process can be repeated 141 until there are no more medicine packages 14 on the storing rod 48. The computer 24 knows when to stop returning packages since it knew how many packages had been placed on the storing rod 48.

In the event that all drugs to be returned or restocked at a particular storage location are identical the process is somewhat different. Packages are picked from the supply rack in the method detailed above. The gripper assembly is then moved to a position in front of the storage rack to place the remaining packages on the storage rod. Cylinder 48A causes the assembly of storing rod 48 and pusher plate 57B to move in the negative Z direction. Storage rod 48 is co-linear with a rod 30 of support structure 28. Pusher plate 57B then moves in the positive Z direction pushing all remaining packages on storage rod 48 on to rod 30.

Figure 15:
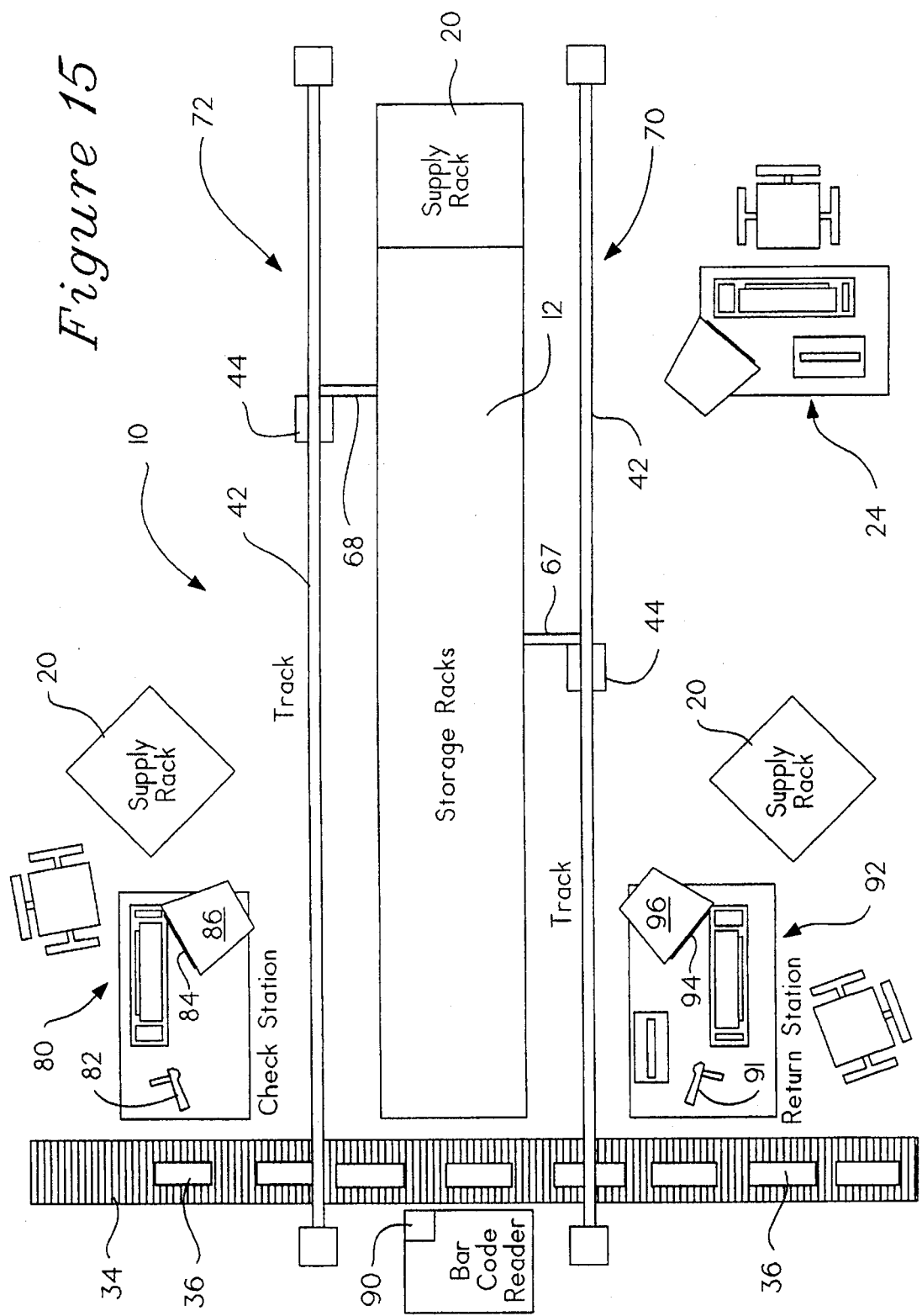
FIG. 15 is a schematic overhead view of an alternative system for filling an order.

The restocking of the storage racks 12 can be carried out during the evening when packages are not being gathered to fill orders. Alternatively, restocking can be carried out simultaneously with picking if the system 10 has a pair of rods as shown in FIG. 14, a first end of arm tooling 67, second end of arm tooling 68 and a first tooling structure 70 and a second tooling structure 72 is utilized, as shown in FIG. 15. While, for instance, the first end of arm tooling 67 is picking medicine packages 14 to fill a patient's prescription the second end of arm tooling 68 can be restocking the second side of the storage area 12.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

We claim:

1. A system for selecting and delivering medicine packages from a holding means to fill orders comprising:

a) holding means comprised of a frame having a plurality of support rods each support rod sized for holding a plurality of medicine packages, each rod associated with a given medicine and holding medicine packages with only the same medicine each support rod having a distinct X, Y coordinate location;

b) means for picking medicine packages from the support rods in accordance with instructions received from a computer, said picking means being able to access the holding means; the picking means capable of holding a plurality of medicine packages which have been picked from the holding means;

c) a computer having a database containing an X, Y coordinate location for all packages in the holding means, the computer able to receive orders for packages and able to direct the means for picking packages; and d) a supply structure having a plurality of supply support rods which extend from said structure to form an X, Y coordinate system, with each supply support rod and medicine package thereon having a unique X and Y coordinate, said picking means disposed to have access to said structure such that a given medicine package on an associated supply support rod can be picked by the picking means to fill a patient's prescription, or a given medicine package in the supply structure can be picked by the picking means to restock an associated rod in the holding means.

2. A system as described in claim 1 including a conveyor in communication with the picking means; and patient prescription boxes which are moved by the conveyor to the picking means such that the picking means provides the medicine packages it has picked to fill a given prescription to an associated box.

3. A system as described in claim 1 wherein the picking means includes at least one gripper that picks the medicine packages; and a tooling support structure having at least one column supporting the column such that the picking means moves along the column as the column moves along the row to pick a given medicine package hanging from a corresponding support rod, or restock a given medicine package on a corresponding support rod; and means for moving the column with respect to the row, said moving means controlled by the computer.

4. A system as described in claim 3 wherein the picking means is comprised of:

a housing;

means for storing a plurality of medicine packages attached to the housing;

means for obtaining a medicine package, said obtaining means slidingly attached to the housing such that it can move in a Z direction, which is perpendicular to the X and Y directions, to pick a medicine package from a support rod when the housing is adjacent to and aligned with a support rod, and can move in the Z direction to place a picked package on the storing means; and identifying means attached to the at least one gripper such that it can identify a package to be picked by the obtaining means, each of said packages having an identity disposed on them which can be read by the identifying means.

5. A system described in claim 4 wherein the identity of each package is a bar code, and the identifying means includes a bar code reader disposed on the obtaining means.

6. A system as claimed in claim 1 wherein the support rods extend from back rod supports within the frame in sets of two, with a first rod and a second rod on each set pointing essentially in a Z direction which is perpendicular to the X and Y directions, but approximately 180° apart from each other.

7. A system for selecting and delivering packages from a holding means to fill orders comprising:

a) holding means comprised of a frame having a plurality of support rods for holding packages each support rod having a distinct X, Y coordinate location and holding a plurality of packages, all of those packages on each support rod having similar contents;

b) picking means for picking packages from the support rods in accordance with instructions received from a computer, the picking means being able to access the holding means and having a housing;

means for storing packages attached to the housing;

means for producing a suction;

a suction rod in fluid connection with the suction producing means, said suction rod slidingly attached with respect to the Y and Z directions to the housing and maintaining a suction therethrough when the suction producing means is activated by which a medicine package is picked with suction; and means for sensing when a package is properly positioned such that the package rod is then moved to the storing means and deposits the package thereon.

8. A system as described in claim 7 wherein the storing means is a storing rod which extends from the housing such that the suction head and the suction rod can deposit a package thereon.

9. A system as described in claim 8 wherein the tooling includes valves and pneumatic cylinders for moving the suction rod in the Y and Z direction; and a vacuum pump for providing suction to the suction rod and support head sufficient to pick a package from a rod of the support structure and then hold it to the suction head.

10. A system as described in claim 9 wherein the suction head has two faces through which a suction can be drawn, each face capable of picking a package.

11. A system as described in claim 10 wherein the two faces are parallel to each other and are parallel to the x-axis, and wherein each package has a face and the package are held by the storing rod and the rods of the support structure such that the face of each package is parallel to the x-axis.

* * * * *